(12) United States Patent
Ross

(10) Patent No.: US 10,700,889 B2
(45) Date of Patent: Jun. 30, 2020

(54) RING NETWORK FOR A VEHICLE

(71) Applicant: CONTINENTAL AUTOMOTIVE GMBH, Hannover (DE)

(72) Inventor: Hans-Leo Ross, Lorsch (DE)

(73) Assignee: Continental Automotive GmbH, Hannover (DE)

( * ) Notice: Subject to any disclaimer, the term of this patent is extended or adjusted under 35 U.S.C. 154(b) by 118 days.

(21) Appl. No.: 14/407,886

(22) PCT Filed: Jun. 10, 2013

(86) PCT No.: PCT/EP2013/061881
§ 371 (c)(1),
(2) Date: Dec. 12, 2014

(87) PCT Pub. No.: WO2013/186154
PCT Pub. Date: Dec. 19, 2013

(65) Prior Publication Data
US 2015/0138954 A1 May 21, 2015

(30) Foreign Application Priority Data

Jun. 14, 2012 (DE) .......................... 10 2012 210 057

(51) Int. Cl.
*H04L 12/42* (2006.01)
*H04L 12/437* (2006.01)
(Continued)

(52) U.S. Cl.
CPC ............ *H04L 12/42* (2013.01); *H04L 12/422* (2013.01); *H04L 12/437* (2013.01); *H04L 41/0654* (2013.01); *H04L 2012/40273* (2013.01)

(58) Field of Classification Search
None
See application file for complete search history.

(56) References Cited

U.S. PATENT DOCUMENTS 5,568,484 A * 10/1996 Margis .................. H04L 12/433
348/837
6,326,704 B1 12/2001 Breed et al.
(Continued)

FOREIGN PATENT DOCUMENTS

CN 102035702 4/2011
EP 2309678 A1 4/2011
(Continued)

OTHER PUBLICATIONS

Office Action dated Dec. 9, 2016 which issued in the corresponding Chinese Patent Application No. 2013800308548.

*Primary Examiner* — Anh Vu H Ly
*Assistant Examiner* — Hector Reyes
(74) *Attorney, Agent, or Firm* — Cozen O'Connor

(57) ABSTRACT

A ring network for interchanging data between a plurality of devices arranged in a vehicle includes a ring connection and a plurality of distributors. The distributors each have a plurality of communication pairs each having a transmitting unit and a receiving unit for transmitting and receiving data. Each of the devices is connected to one of the distributors via a first communication pair, to the ring connection via a second communication pair and likewise to the ring connection via a third communication pair. A direction of data flow in the second communication pair and the third communication pair is opposite.

16 Claims, 5 Drawing Sheets

(51) Int. Cl.
*H04L 12/24* (2006.01)
*H04L 12/40* (2006.01)

(56) References Cited

U.S. PATENT DOCUMENTS

| | | | |
|---|---|---|---|
| 6,680,912 B1* | 1/2004 | Kalman | H04J 3/085 370/238 |
| 7,926,077 B2 | 4/2011 | Gollwitzer | |
| 8,154,989 B1* | 4/2012 | Susai | H04L 12/437 370/216 |
| 2003/0043779 A1* | 3/2003 | Remboski | H04L 12/42 370/351 |
| 2005/0129037 A1 | 6/2005 | Zumsteg et al. | |
| 2005/0180752 A1* | 8/2005 | Nakagawa | H04J 14/0227 398/83 |
| 2009/0077551 A1 | 3/2009 | Whiteley | |
| 2010/0188972 A1* | 7/2010 | Knapp | H04L 12/43 370/226 |
| 2011/0026411 A1 | 2/2011 | Hao | |
| 2011/0145433 A1* | 6/2011 | Noel | H04L 12/437 709/232 |
| 2012/0290692 A1* | 11/2012 | Reich | H04L 12/437 709/220 |
| 2014/0359364 A1* | 12/2014 | Sivasankar | H04L 12/437 714/37 |

FOREIGN PATENT DOCUMENTS

| | | |
|---|---|---|
| WO | WO 2005/053223 A2 | 6/2005 |
| WO | WO 2005/062534 A1 | 7/2005 |
| WO | WO 2009/003557 | 1/2009 |

* cited by examiner

RING NETWORK FOR A VEHICLE

CROSS-REFERENCE TO RELATED APPLICATIONS

This is a U.S. national stage of application No. PCT/EP2013/061881, filed on 10 Jun. 2013, which claims priority to the German Application No. DE 10 2012 210 057.1 filed 14 Jun. 2012, the content of both incorporated herein by reference.

BACKGROUND OF THE INVENTION

1. Field of the Invention

The present invention relates to a ring network, preferably an Ethernet-based ring network, for transferring data between a plurality of electronic control modules arranged in a vehicle, and relates to a vehicle in which such a network is integrated.

2. Related Art

There is an ever greater need for motor vehicles to have a constantly available communications architecture that can guarantee the vehicle safety even in the event of a fault. Currently used communications systems are often deficient in terms of speed, data volumes or limiting network users, so for instance limiting nodes in the network. Even when a plurality of buses or even redundant buses are used in the network, there are problems because data can be transferred between the buses only via individual processors or electronic control modules. With redundant buses there is also the problem of synchronizing the data flows.

A large volume of data and a large number of electronic control modules in the vehicles require a constantly increasing communications availability between the electronic control modules. Since complexity (e.g., a number of functions in an electronic control module) and dynamics in the vehicles are constantly increasing, the response times of the networked systems are also becoming ever more time-critical. The large number of dependent actuators in the vehicle means that all the data must be reliably available to all the electronic control modules in very short time intervals, typically in the region of milliseconds, because otherwise functional safety can no longer be guaranteed for modern vehicle functions. The demands placed on networked systems as a result of increasing e-mobility can be expected to rise further, and hence the dependency of functions will grow. For example, "steer-by-wire" or "brake-by-wire" concepts require high-availability safety networks to ensure safe operation even in the event of a fault. In order to guarantee sufficient functional safety, the data flows must hence have a certain determinism for data to be transmitted reliably also to the receiving electronic control module in a defined time period. A reliable real-time capability can hence be guaranteed, which ensures that the electronic control module is actually working with live data.

Thus, solutions are known from the prior art in which the individual electronic control modules are connected to the network via network switches, wherein a data flow direction within the network is predetermined in order to simplify control of the network. This has the disadvantage, however, that when there is a break in the network, the data flow is no longer guaranteed and it is no longer possible to reach all the electronic control modules and/or all the actuators.

SUMMARY OF THE INVENTION

Hence an object of the present invention is to propose a network for a vehicle, which network avoids the stated disadvantages and hence can be operated in a failsafe manner in the event of a break in the network.

This object is achieved according to the invention by a network and a vehicle as set forth below.

The network for transferring data between a plurality of electronic control modules arranged in a vehicle is in the form of a ring and comprises a ring connection and a plurality of network switches. Each of the network switches comprises a plurality of communications pairs, which each comprise a transmit unit and a receive unit for transmitting and receiving data. Each of the electronic control modules is connected to one of the network switches via a first communications pair, and each of the network switches is connected to the ring connection via a second communications pair. By at least one of the network switches additionally comprising a third communications pair and being connected to the ring connection via the third communications pair, wherein a data flow direction is opposite in the second communications pair and the third communications pair of this network switch, the data flow can be maintained even when there is a break in the ring network. The network is hence fault tolerant owing to the ring structure. The ring connection can here be implemented in a wired form, for example by one or more cables, an optical fiber or a plurality of optical fibers, or wirelessly (e.g., by radio, WLAN, infrared etc.).

The at least one of the network switches is typically configured to reverse the data flow direction through this network switch when there is a break in the ring connection. If the network is no longer working at a specific point, the network switch having the third communications pair can select the data flow direction as required, with the result that data can still be transferred along the ring connection in all directions.

Preferably all the network switches in the network comprise the third communications pair and are connected to the ring connection via the third communications pair. The data in the network can thereby be routed from any of the network switches into the desired direction when there is the break in the ring connection.

The transmit units and receive units forming the respective communications pairs can obviously also be combined in one component, which hence both transmits and receives. This keeps the design of the network switch simpler.

The ring network can be implemented on the basis of Ethernet technology and therefore make use of the already known properties of this network type proven in other technical sectors. Ethernet has experienced enhanced development in the multimedia and telecommunications sector, and provides low-cost and very powerful functions. In particular, properties such as data transmission rate and data packet size, and technical solutions for improving these properties, are supported also by other sectors such as multimedia owing to continuous growth and developments. Alternative data transmission systems such as Most, CAN, Flexray etc., are solutions specific to the automotive sector. Electronic control modules in an Ethernet network can be synchronized amongst one another, synchronized centrally from one location or even triggered externally. It is also possible to synchronize real-time systems to different time bases, with data communications still providing a determinism needed for safety engineering. Hence even different real-time requirements can be achieved in the network, and safe functions for steering systems can be guaranteed in a few milliseconds. For instance, a braking system having a safety time of 100 ms can be implemented in a ring network with sufficient safety compliance.

It can be provided that the electronic control modules preferably include at least one engine control module, a brake control module, an airbag control module, a steering control module and/or a module for interfacing to another network. These modules can each control one or more actuators and/or sensors or receive signals from same. A multiplicity of modules and/or actuators routinely requiring control in vehicles can thereby be controlled by the network. In addition, the facility to interface further modules or actuators, such as cameras for a front-area sensor system for example, means that the network can be expanded, for instance via peer-to-peer connections.

Alternatively or additionally, the ring connection, provided it is in wired form, can comprise a multicore cable and/or a fiber-optic cable. This provides components that allow rapid data flow in a plurality of directions. Preferably the data flow direction in the multicore cable hence also differs on the different wires. Different cabling can be chosen according to the requirement for distance, time and data volumes, and even the simplest twisted-pair cabling systems achieve better performances than previous bus systems.

At least one of the network switches (e.g., an Ethernet hub) is typically integrated in a control unit or in one of the electronic control modules, enabling a space-saving design, for example on a single circuit board.

The control unit preferably comprises a plurality of cores. Modern microcontrollers as control units use a plurality of processing cores to achieve high performance but also for reliability reasons. In addition, communication in these microcontrollers between the processor cores and the peripherals is already implemented using redundant switch technology (such as bus bar, communications bridges). This switch technology is similar to switches that are also used in Ethernet. There are also already automotive controllers that have integrated an Ethernet transceiver (network switch). Since in this processor the entire peripherals, processing cores and all internal communications are already implemented in autonomous, redundant form, it is also already possible here to implement a redundant Ethernet interface connection for a single (multicore) microcontroller. Hence the disadvantages of a standard Ethernet connector such as the RJ 45 can already be eliminated even with regard to connection technology.

It can also be provided that the ring connection comprises a first channel and a second channel and a plurality of network switches which comprise the third communications pair.

The second communications pair of each of the network switches is connected to the first channel, and the third communications pair of each of the network switches is connected to the second channel. The ring connection can also be implemented in wired form or wirelessly in this case. In particular, one of the two channels can be wired whereas the other channel can have a wireless implementation. The fact that the ring connection consists of two channels minimizes the risk of the network failing as a result of a line break, because one of the channels may still be intact. The connection of the communications pairs, however, ensures the full functionality of the ring connection and hence of the ring network even in the event of a line break. The data flow direction on the first channel is preferably opposite to the data flow direction of the second channel. The ring network can also have an autonomous, redundant design, for example in the form of two separate rings in the network.

The ring network having the described properties is typically used in a vehicle, although external control units can also be integrated using radio technology.

Since Ethernet can transmit large data packets and such an Ethernet with a redundant design has reliability and high availability in the ring structure, it is also possible to implement functions and/or software applications in different control units or electronic control modules. This means that a software application no longer needs to be stored in the electronic control module or the control unit in which it also runs. Instead, the ring network can be configured to allocate the functions and/or software applications to one of the control units or one of the electronic control modules. Certain functions can even be loaded into different instances of the electronic control modules or of the control units as required, so that a safe function can be guaranteed even when entire electronic control modules or control units fail. Such functions can also be stored redundantly in different electronic control devices or control units in order to be able to implement specific emergency scenarios.

A switched Ethernet also offers comparable data communication to that familiar today from the Internet, i.e., the data from a sensor is made available to the network. This data is sent to an addressee via the fastest connection possible, and when the first correct data packet arrives, later data packets can be discarded and used for reliable plausibility checking of the data.

In addition, this data can be encrypted and transmitted autonomously in the network via what is known as a tunnel or a tunnel protocol (comparable with VPN in the Internet). This can avoid fundamental error models in communication, and provide the autonomy necessary for safety engineering. The tunnel protocol can also be configured to control allocation of communications users. It can also be provided that the data being communicated via the network is made available not to a specific communications user but generally to the network, so that every communications user authorized to do so can use this data.

BRIEF DESCRIPTION OF THE DRAWINGS

Exemplary embodiments of the invention are shown in the drawings and described below with reference to FIGS. 1 to 5, in which.

DETAILED DESCRIPTION OF THE PRESENTLY PREFERRED EMBODIMENTS

Figure 1:
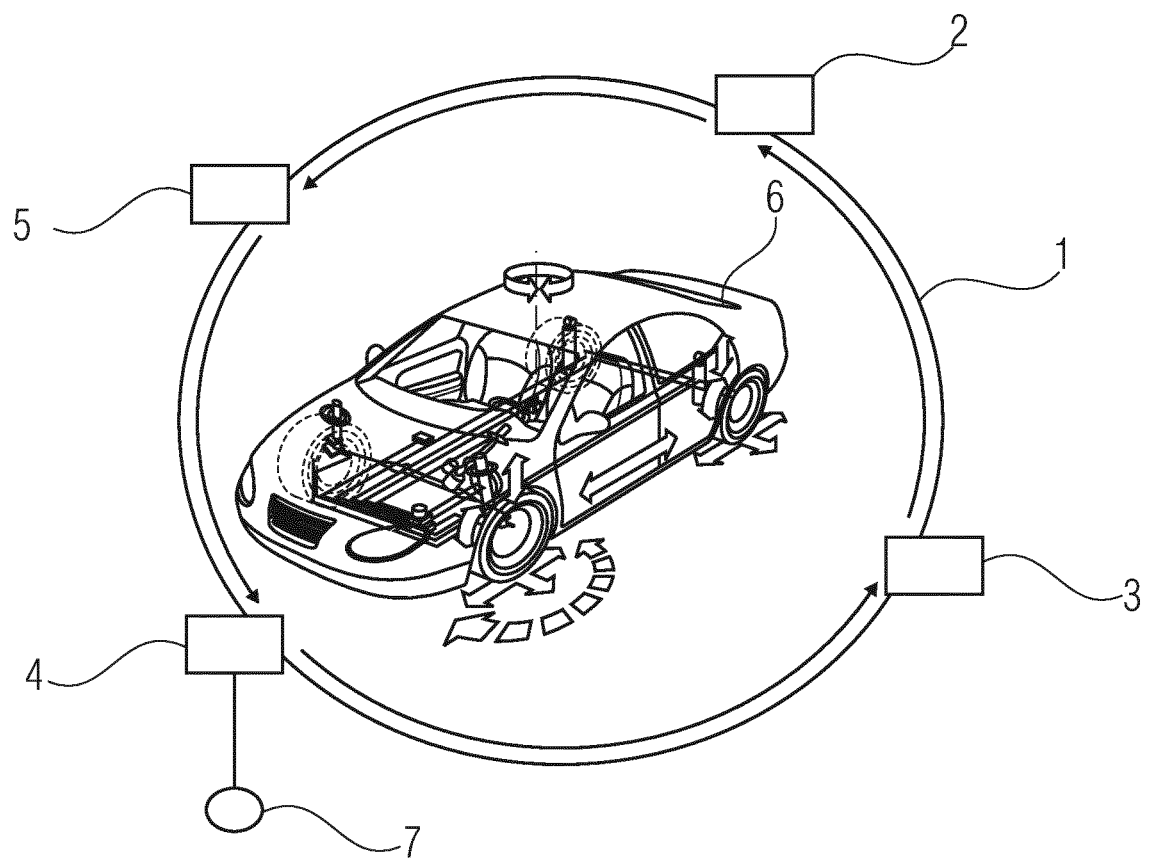
FIG. 1 is a schematic diagram of a ring network in a vehicle.

FIG. 1 shows, in a schematic view, a ring network comprising a single-channel ring connection 1. The network is arranged in a vehicle 6, in a car in the exemplary embodiment shown, and connects a plurality of electronic control modules, specifically a brake control module 2, an airbag control module 3, a steering control module 4 and an engine control module 5, to one another via the ring connection 1. The modules are each connected to the ring connection 1 via a network switch.

The modules 2, 3, 4, 5 each control different actuators and receive data from sensors. The brake control module 2 controls the brakes and further control functions such as an anti-lock braking system (ABS) and an electronic stability program (ESP). The brake control module 2 also supplies information about a wheel speed, a yaw rate and acceleration values. The airbag control module 3 contains a crash sensor system. In addition to adjusting steering, the steering control module 4 also determines a steering angle, a steering-wheel angle and steering moments. The engine control module 5 sets an engine torque and supplies information on an engine power and engine speed.

By virtue of the ring connection 1, all sensor information and all actuator data are available in the entire network. A ring structure for the network means that any bus connection of the network switches can fail without any loss in function occurring.

A bus connection shall be understood to mean here every connection of the network switch to the ring connection 1.

Additional sensors can become part of the network by means of a connector, acting as a peer-to-peer interface, attached to the steering control module 4. For example, a front-area sensor system comprising a camera and a radar unit as part of a driver assistance system can be connected to the network. Of course additional sensors can also be integrated into the network via other physical implementations, however.

The Ethernet-based network hence forms an Ethernet-switched ring network. In the switched network, the electronic control modules 2, 3, 4, 5 can control all the actuators independently of one another and also make available all the data from the network (i.e., sensor data, status data from the modules 2, 3, 4, 5 and from the actuators and diagnostic functions). By using Ethernet, and thanks to central synchronization of all the modules 2, 3, 4, 5, it can also be guaranteed that all the data is reliably available. The ring structure means that the network is fault tolerant and a break can be monitored at any point of the ring connection 1. All the time requirements can be maintained with today's switch technology. The network itself, in the exemplary embodiment shown, is integrated in a (multicore) microcontroller, which is a modern device in the automotive sector, with the ring connection 1 being implemented by a cable or a conductor track. The data flows counterclockwise on the ring connection 1, but can also flow clockwise from module to module in other embodiments. Using components and architectures that are already proven in other industries reduces a risk of failure when employing these components and architectures in the automotive sector. The behavior in the event of a fault can also be assessed to be sufficiently safe based on knowledge in other industries.

Figure 2:
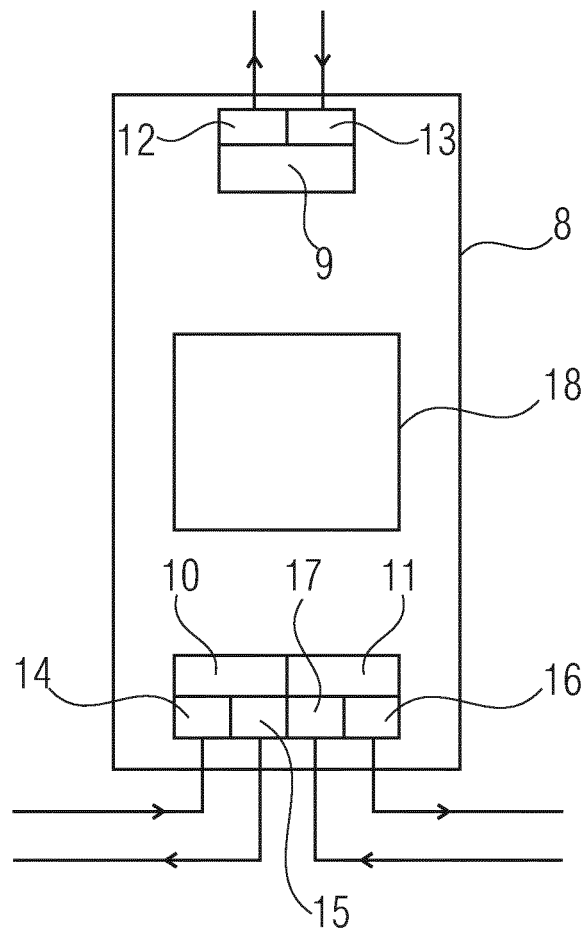
FIG. 2 is a schematic view of a network switch of the network.

FIG. 2 shows a schematic view of one of the network switches 8 (for example a transceiver; a physical data receiver or a transmitter (Basis: xBaseTx), via which the modules 2, 3, 4, 5 are connected to the ring connection 1. The same reference signs denote recurring features in this and also the other drawings. The network switch 8 is an Ethernet switch and has a first port 9, a second port 10 and a third port 11. Each of the ports 9, 10, 11 comprises a transmit unit and a receive unit, which according to the embodiment can be implemented each as separate components or as a single component. The transmit unit 12 of the port 9 transmits data to one of the modules 2, 3, 4, 5, whereas the receiver unit 13 receives data coming from the respective module of the modules 2, 3, 4, 5. The port 9 hence forms by the transmit unit 12 and the receiver unit 13 a communications pair, via which the network switch 8 is connected to one of the modules 2, 3, 4, 5, for example via a standard Ethernet connector such as an RJ-45 connector.

The second port 10 likewise comprises a transmit unit 15 and a receive unit 14. The transmit unit 15 transmits data from the network switch 8 to the ring connection 1, whereas the receive unit 14 receives data from the ring connection 1. The third port 11 comprises a transmit unit 16 and a receive unit 17, which likewise receive data from the ring connection 1 and transmit data to same. The port 10 comprising the transmit unit 15 and the receive unit 14 hence forms a second communications pair, while the port 11 comprising the transmit unit 16 and the receive unit 17 forms a third communications pair.

A data flow direction in the second port 10 is different from a data flow direction in the third port 11; in the present exemplary embodiment, the data flow directions are opposite to each other. A direction from which the receive unit 14 receives the data is opposite to a direction from which the receive unit 17 receives the data from the ring connection 1. Likewise, the transmit unit 15 transmits the data in an opposite direction to the transmit unit 16. The network switch 8 uses a switching unit 18 to provide suitable routing of the data, and transfer of the data between the ring connection 1 and the module connected to the respective network switch 8. The switching unit 18 can be implemented by a logic circuit, for example. All the components of the network switch 8 are combined on a single circuit board.

The switching unit 18 is programmed to reverse the data flow direction through the network switch 8. This can be achieved by switching back and forth between use of the ports 10 and 11, but also by using the receive unit 17 together with the transmit unit 15 and disabling the receive unit 14 and the transmit unit 16. Of course the receive unit 14 and the transmit unit 16 can also be enabled and the receive unit 17 and the transmit unit 15 disabled.

Figure 3:
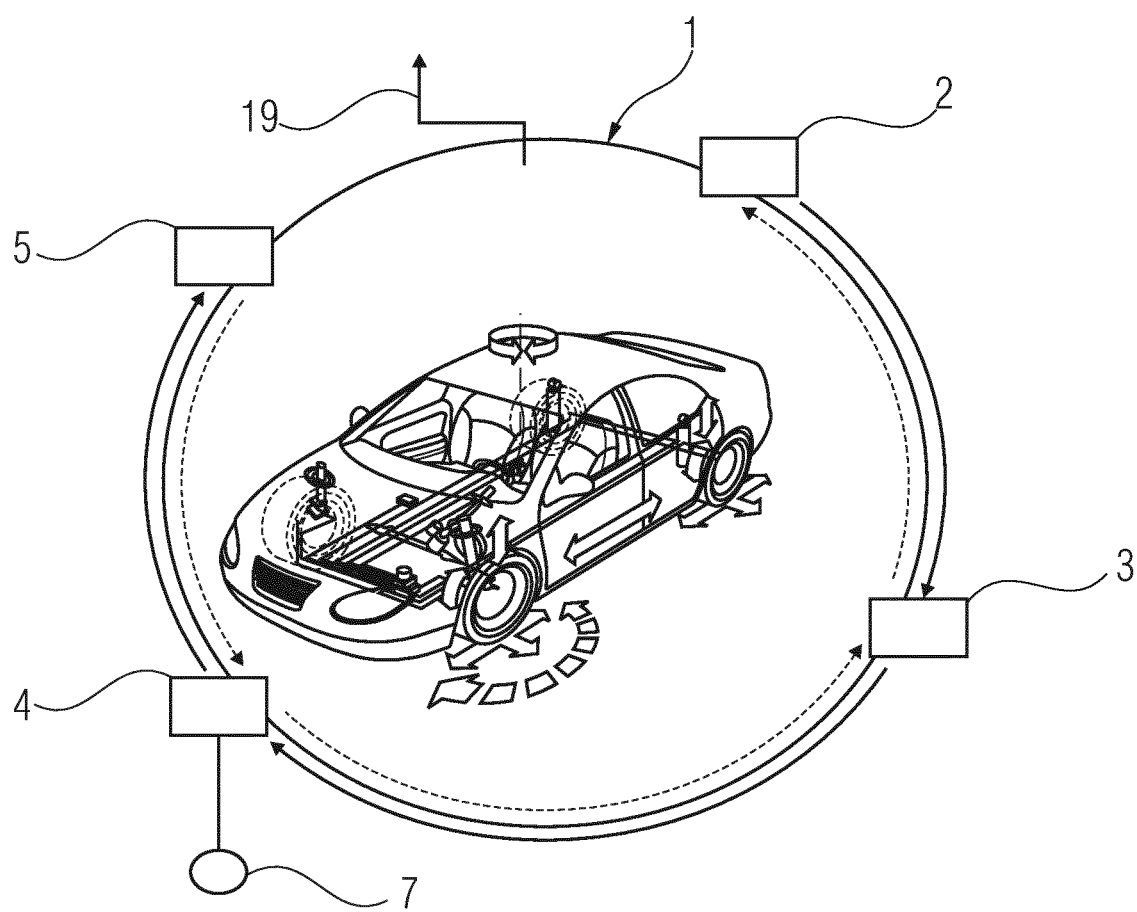
FIG. 3 is a diagram corresponding to FIG. 1 of the ring network having a line break.

FIG. 3 shows in a diagram corresponding to FIG. 2 the ring network after a line break 19 in the ring connection 1 between the engine control module 5 and the brake control module 2. The line break 19 may take the form of a disconnection of the cable forming the ring connection, or, in the case of a wireless implementation of the ring connection 1, a loss of the wireless link, for instance caused by an interference signal. The data originally circulating counterclockwise on the ring connection 1 is thus now unable to get from the brake control module 2 to the engine control module 5. As soon as the line break 19 has been detected, the network switches 8 reverse by the switching unit 18 the data flow direction as required, so that the data can now get from the brake control module 2 to the engine control module 5 clockwise on the ring connection 1. A reversal can be performed here by a "fast recovery protocol", which detects in real time the line break 19 and the location thereof, and subsequently enables an alternative communications path in the network. Hence availability of the data in the network is increased even in the single-channel network architecture shown in FIG. 3. Owing to the line break 19, which arises at any point in the network, all the communications connections are maintained and there is no loss of function in the network. The data flow direction is here reversed without an interruption, i.e., typically within a maximum of 5 μs. Data delays remain approximately deterministic even when there is a line break. The "fast recovery protocol" means that communication faults can be detected and alternative communications paths enabled immediately. The degradation concept for the entire vehicle can be designed even in the event of a fault on the basis of this determinism. A largely interruption-free implementation of the safety-critical functions on the electronic control modules 2, 3, 4, 5 can hence be guaranteed.

Figure 4:
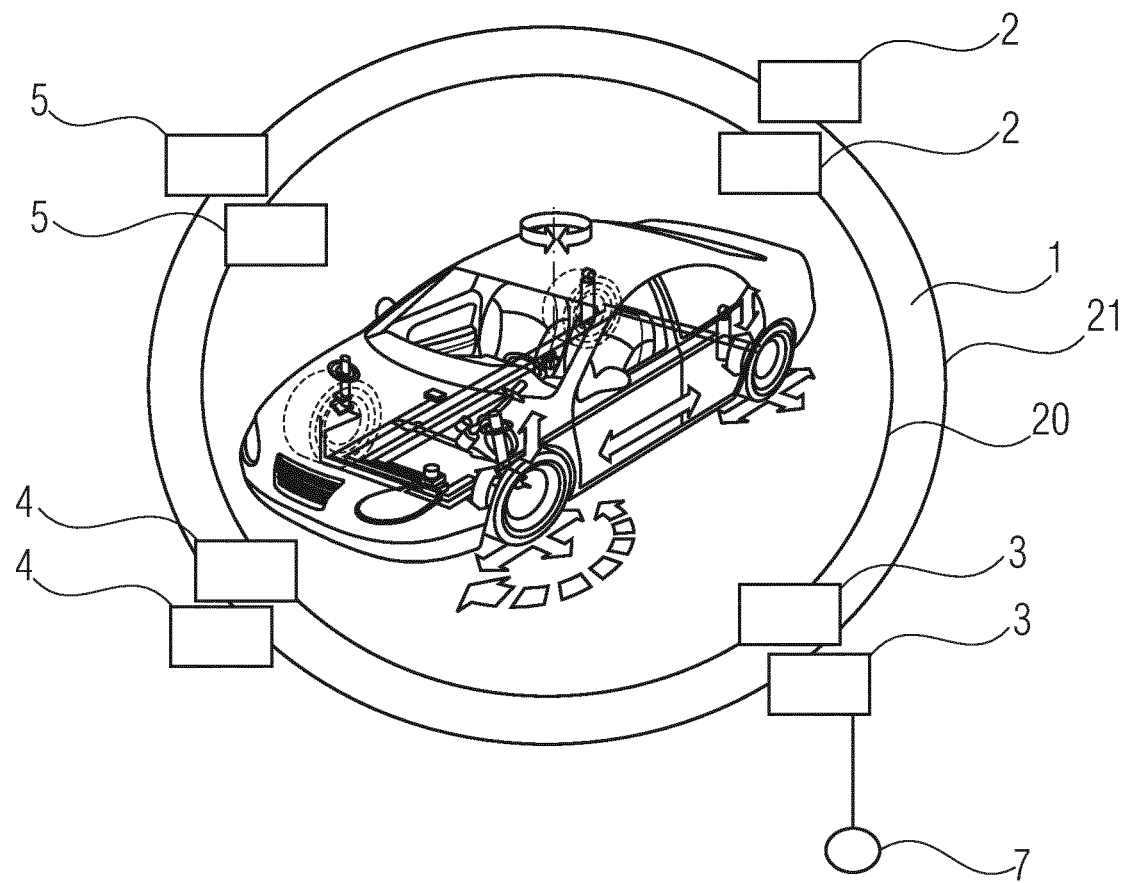
FIG. 4 is a diagram corresponding to FIG. 1 of the ring network having a ring connection comprising two channels.

FIG. 4 shows in a diagram corresponding to FIG. 1 the ring network, wherein the ring connection 1 is now embodied as a multichannel ring connection having a first line 20 as a first channel for data flow in a first direction, and a second line 21 as a second channel for data flow in a second direction. The first direction is usually opposite to the second direction. The modules 2, 3, 4, 5 are each connected to the first line 20 and to the second line 21. A further network can be connected again by a peer-to-peer connection to the ring network via the connector 7, which now, unlike the exemplary embodiment shown in FIG. 1, is arranged on the airbag control module 3. The ring connection 1 is in the form of a multicore cable, wherein the first line 20 and the second line 21 form respective wires of this cable, and the ring connection 1 is a twisted-pair cable. Alternatively or additionally, the ring connection 1 can also be implemented by fiber-optic cables or at least comprise same. In this case, only one fiber-optic cable is used as the ring connection 1, with the data flow on the first channel given by a first optical wavelength, and the data flow on the second channel given by a second optical wavelength. In further exemplary embodiments, it is also possible to provide two fiber-optic cables, one for each of the channels. In further embodiments, both the single-channel or multichannel ring connection 1 can be implemented by a wireless connection, for example a radio link or an infrared link. In the case of the multichannel connecting line 1, the different channels can also be based on different transmission forms, for instance the first channel can be wired and the second channel can comprise a radio link.

Figure 5:
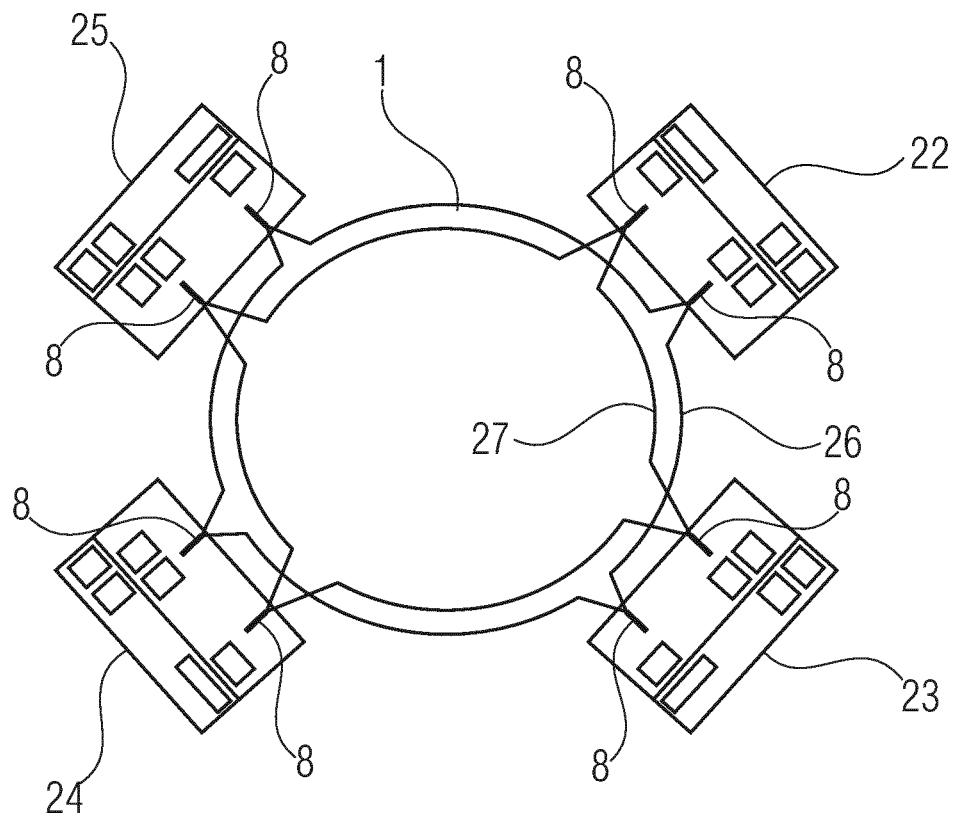
FIG. 5 is a further exemplary embodiment of a network having a ring connection comprising two channels and a plurality of control units.

FIG. 5 shows a further exemplary embodiment of the ring network, in this case as a redundant network. Control units having a plurality of processor cores, such as multicore controllers, are able to integrate Ethernet switches. There are also redundant multicore designs, which each support, for example, two cores in lockstep (two redundantly-coupled cores) for higher availability and hence increased fault tolerance.

Thus in the exemplary embodiment shown in FIG. 5, the modules 2, 3, 4, 5 are each arranged on one of the control unit 22, 23, 24, 25. In addition to further functional units, such as, for example, a CAN bus, components for a Bluetooth connection, a LAN connection and other bus connections, the control units also each comprise two of the network switches 8. The control units 22, 23, 24, 25 are spatially separate from the modules 2, 3, 4, 5, but in other exemplary embodiments can also be combined with same as one component.

The ring connection 1 is again designed as a ring connection having two channels composed of two independently implemented fiber-optic cables 26 and 27. One of the network switches 8 on the control units 22, 23, 24, 25 is connected to the first fiber-optic cable 26, while the respective other network switch of the network switches 8 is connected to the second fiber-optic cable 27. In further embodiments, the network switch can also be part of the electronic control modules 2, 3, 4, 5. The network is again of Ethernet type, with the result that all the control units 22, 23, 24, 25 are synchronized to a common time base, and the Ethernet is interfaced redundantly to the control units 22, 23, 24, 25. Calculable safety characters can hence be defined for all the safety functions running via the network. The control units 22, 23, 24, 25 enable standardized communication between all the modules 2, 3, 4, 5 in the network.

In addition, data packets can use the full bandwidth of the Ethernet and are thereby available to each controller in a very short time. The entire ring network runs within a fixed time frame, with the result that all the control units 22, 23, 24, 25 are synchronized to a common time base. Hence calculable safety characters can be defined for all the safety functions running via the network.

A tunnel protocol is used to control allocation of communications users, and the data to be communicated via the network is made available not to one specific module of the electronic control modules 2, 3, 4, 5 as communications users, but generally to the network. A software application is stored in one of the electronic control modules 2, 3, 4, 5 or one of the control units 22, 23, 24, 25, but is provided for all the modules via the network.

Features of the various embodiments disclosed only in individual exemplary embodiments can be combined with one another and claimed separately.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A ring network for transferring data between a plurality of electronic control modules (2; 3; 4; 5) arranged in a vehicle (6), the ring network comprising:
    a single bidirectional channel ring connection (1); and
    a plurality of network switches (8), each switch having at least first and second communications pairs (9; 10; 11), each having a transmit unit (12; 15; 16) and a receive unit (13; 14; 17) for transmitting and receiving data, respectively, and configured to monitor network faults in real time;
    wherein each of the plurality of electronic control modules (2; 3; 4; 5) is connected to one of the plurality of network switches (8) via a first communications pair (9),
    wherein each of the plurality of network switches (8) is connected to the single channel ring connection (1) via a second communications pair (10), and
    wherein at least one of the plurality of network switches (8) additionally comprises a third communications pair (11) and is connected to the single channel ring connection (1) via a respective transmit unit (16) and a respective receive unit (17) for transmitting and receiving data of the third communications pair (11), and a data flow direction is opposite in the second communications pair (10) and the third communications pair (11) of this network switch (8),
    wherein the network switch is configured to detect a line break and an actual location of the line break in real time and switch data flow direction in a maximum of 5 µs upon detection of a network fault so as to enable an alternative communications path in the network to maintain communication connections with no loss of function in the network, and wherein upon detection of the line break at least one of the plurality of network switches (8) is configured to change an operating communications pair from the second communication pair to the third communication pair (10, 11) to transmit data in the opposite direction on the ring using the changed communication pair (10, 11).

2. The ring network as claimed in claim 1, wherein the at least one of the plurality of network switches (8) is configured to reverse the data flow direction through this network switch (8) when a break (19) is present in the single channel ring connection (1).

3. The ring network as claimed in claim 1, wherein the ring network is an Ethernet.

4. The ring network as claimed in claim 3, wherein at least two of the electronic control modules (2; 3; 4; 5) of the network are synchronized with one another.

5. The ring network as claimed in claim 1, wherein the electronic control modules include at least one engine control module (5), a brake control module (2), an airbag control module (3), a steering control module (4) and/or a module (7) for interfacing to another network.

6. The ring network as claimed in claim 1, wherein the ring connection (1) comprises a multicore cable and/or a fiber-optic cable, and the data flow direction in the multicore cable differs on the different wires.

7. The ring network as claimed in claim 1, wherein at least one of the plurality of network switches (8) is integrated in a control unit (22; 23; 24; 25).

8. The ring network as claimed in claim 1, wherein the network is configured to transfer a software application to one or more of the electronic control modules (2; 3; 4; 5) during operation.

9. A vehicle (6), having a ring network as claimed in claim 1.

10. The ring network as claimed in claim 4, wherein all of the electronic control modules (2; 3; 4; 5) of the network are synchronized with one another.

11. The ring network as claimed in claim 6, wherein the multicore cable is a twisted-pair cable.

12. The ring network as claimed in claim 7, wherein the control unit (22; 23; 24; 25) have a plurality of cores.

13. The vehicle (6) as claimed in claim 9, wherein the vehicle is a car.

14. The ring network as claimed in claim 1, wherein at least one of the communications pairs is a wireless connection.

15. The ring network as claimed in claim 1, wherein the data is encrypted and transmitted autonomously.

16. The ring network as claimed in claim 1, wherein a tunnel protocol controls allocation of communications users and the data communicated via the ring network.

* * * * *